US012271226B2

(12) United States Patent
Chou et al.

(10) Patent No.: US 12,271,226 B2
(45) Date of Patent: Apr. 8, 2025

(54) COMPUTER WITH FUNCTION EXPANSION MECHANISM AND FUNCTION EXPANSION METHOD WITHOUT REMOVAL OF COMPUTER

(71) Applicant: GETAC TECHNOLOGY CORPORATION, New Taipei (TW)

(72) Inventors: Hsin-Chih Chou, Taipei (TW); Juei-Chi Chang, Taipei (TW); Wan-Lin Hsu, Taipei (TW); Kun-Cheng Lee, Taipei (TW)

(73) Assignee: GETAC TECHNOLOGY CORPORATION (TW)

( * ) Notice: Subject to any disclaimer, the term of this patent is extended or adjusted under 35 U.S.C. 154(b) by 88 days.

(21) Appl. No.: 17/884,485

(22) Filed: Aug. 9, 2022

(65) Prior Publication Data

US 2023/0116528 A1   Apr. 13, 2023

Related U.S. Application Data

(60) Provisional application No. 63/253,512, filed on Oct. 7, 2021.

(51) Int. Cl.
*G06F 1/16* (2006.01)

(52) U.S. Cl.
CPC .......... *G06F 1/1632* (2013.01); *G06F 1/1616* (2013.01); *G06F 1/1656* (2013.01)

(58) Field of Classification Search
CPC .... G06F 1/1632; G06F 1/1616; G06F 1/1656; G06F 1/181; G06F 1/182; G06F 2200/1635; G06F 1/1658
See application file for complete search history.

(56) References Cited

U.S. PATENT DOCUMENTS 5,264,992 A * 11/1993 Hogdahl ............... G06F 1/1656
428/317.1
6,093,039 A    7/2000 Lord
(Continued)

FOREIGN PATENT DOCUMENTS

CN    102640071 A    8/2012
CN    207542619 U    6/2018

OTHER PUBLICATIONS

European Patent Office, Search Report, Application No. 22189893.5, Mar. 4, 2023, 14 pages, Germany.

*Primary Examiner* — Anthony M Haughton
*Assistant Examiner* — Theron S Milliser
(74) *Attorney, Agent, or Firm* — Andy M. Han; Han IP PLLC

(57) ABSTRACT

A computer with a function expansion mechanism includes a computer host and a function expansion device. The computer host includes a base and a functional base cover covering the base. A bottom surface of the base has a first opening, and the base is provided therein with a connector exposed from the first opening. The function expansion device includes an expansion seat, a top surface of the expansion seat has a second opening, and the expansion seat is provided therein with a docking connector exposed from the second opening. The computer host is stacked and assembled by the bottom surface at the top surface of the function expansion device, such that the first opening and the second opening are in communication with each other and the connector and the docking connector are mutually docked, thereby achieving an effect of function expansion without removal of a computer.

10 Claims, 9 Drawing Sheets

(56) References Cited

U.S. PATENT DOCUMENTS

| | | | | |
|---|---|---|---|---|
| 7,889,489 B2* | 2/2011 | Richardson | ............ | G06F 1/1626 |
| | | | | 361/679.01 |
| 7,907,394 B2* | 3/2011 | Richardson | ............ | G06F 1/1613 |
| | | | | 361/679.02 |
| 8,289,698 B1* | 10/2012 | Walder | .................. | G06F 1/1632 |
| | | | | 361/679.41 |
| 8,373,980 B2* | 2/2013 | Reber | .................. | G06F 1/1656 |
| | | | | 361/679.55 |
| 8,531,829 B2* | 9/2013 | Oberpriller | ............ | G06F 1/1632 |
| | | | | 361/679.41 |
| 8,619,417 B1 | 12/2013 | Helton | | |
| 8,699,216 B2* | 4/2014 | Reber | .................. | G06F 1/1656 |
| | | | | 361/679.26 |
| 8,699,220 B2* | 4/2014 | Reber | .................. | G06F 1/1626 |
| | | | | 361/679.4 |
| 8,941,981 B2* | 1/2015 | Reber | .................. | G06F 1/1626 |
| | | | | 361/679.52 |
| 9,261,911 B2* | 2/2016 | Lin | ...................... | G06F 1/1626 |
| 9,383,788 B2* | 7/2016 | Reber | .................... | G06F 1/182 |
| 9,710,024 B2* | 7/2017 | Kim | ...................... | G06F 1/181 |
| 11,099,614 B1* | 8/2021 | Kuo | ...................... | G06F 1/1656 |
| 11,132,030 B2* | 9/2021 | Huang | .................. | H01Q 21/08 |
| 11,175,703 B2* | 11/2021 | Huang | .................. | F16C 11/04 |
| 11,301,003 B2* | 4/2022 | Lee | ...................... | H01Q 1/2266 |
| 11,442,508 B2* | 9/2022 | Chou | .................... | G06F 1/1698 |
| 11,487,333 B2* | 11/2022 | Huang | .................. | G06F 1/1683 |
| 2009/0009945 A1* | 1/2009 | Johnson | ................ | G06F 1/1613 |
| | | | | 29/428 |
| 2009/0034169 A1* | 2/2009 | Richardson | ............ | G06F 1/1632 |
| | | | | 361/679.01 |
| 2012/0099261 A1* | 4/2012 | Reber | .................... | G06F 1/1632 |
| | | | | 361/679.3 |
| 2012/0099262 A1* | 4/2012 | Reber | .................... | G06F 1/182 |
| | | | | 361/679.4 |
| 2012/0099265 A1* | 4/2012 | Reber | .................... | G06F 1/203 |
| | | | | 361/679.02 |
| 2012/0099266 A1* | 4/2012 | Reber | .................... | G06F 1/182 |
| | | | | 361/679.26 |
| 2012/0170203 A1* | 7/2012 | Oberpriller | ............ | G06F 1/1632 |
| | | | | 361/679.41 |
| 2012/0212910 A1 | 8/2012 | Katsuta et al. | | |
| 2015/0103483 A1* | 4/2015 | Lin | ...................... | G06F 1/1626 |
| | | | | 361/679.43 |
| 2015/0138702 A1* | 5/2015 | Reber | .................. | G06F 1/1626 |
| | | | | 361/679.3 |
| 2016/0302320 A1* | 10/2016 | Kim | ...................... | G06F 1/181 |
| 2021/0089080 A1* | 3/2021 | Huang | .................. | H01Q 1/2266 |
| 2021/0089088 A1* | 3/2021 | Lee | ...................... | E05D 5/04 |
| 2021/0089089 A1* | 3/2021 | Huang | .................. | G06F 1/1654 |
| 2021/0089090 A1* | 3/2021 | Lee | ...................... | G06F 1/1654 |
| 2021/0089092 A1* | 3/2021 | Huang | .................. | E05D 5/04 |
| 2021/0092858 A1* | 3/2021 | Chou | .................... | G06F 1/1683 |
| 2023/0116528 A1* | 4/2023 | Chou | .................... | G06F 1/182 |
| | | | | 361/679.41 |
| 2023/0262896 A1* | 8/2023 | Yang | .................. | G06F 1/1632 |
| | | | | 361/760 |
| 2023/0262923 A1* | 8/2023 | Yang | .................. | H05K 7/20409 |
| | | | | 361/695 |

* cited by examiner

COMPUTER WITH FUNCTION EXPANSION MECHANISM AND FUNCTION EXPANSION METHOD WITHOUT REMOVAL OF COMPUTER

CROSS-REFERENCE TO RELATED APPLICATIONS

The present application claims the benefit of U.S. Provisional Patent Application No. 63/253,512, filed on Oct. 7, 2021, the disclosure of which is hereby incorporated by reference herein in its entirety.

BACKGROUND OF THE INVENTION

Field of the Invention

The present invention relates to function expansion of a computer and, more particularly, to a computer with a function expansion mechanism and a function expansion method without removal of a computer.

Description of the Prior Art

Regarding function expansion of a computer, taking a laptop computer for example, a laptop computer includes Part A and Part B that can be opened and closed and Part C and Part D serving as computer hosts. To achieve function expansion of the laptop computer, Part D needs to be first removed in order to assemble an existing function expansion structure at the position from which Part D is removed, causing complications and issues of being time- and labor-consuming.

Moreover, the existing function expansion structure above is provided with multiple recessed spaces, each of which accommodating multiple function expansion elements, so that waterproof structures need to be respectively provided for the recessed spaces. In other words, a corresponding number of waterproof structures need to be provided depending on the number of recessed spaces, similarly resulting in complications and issues of time- and labor-consuming.

SUMMARY OF THE INVENTION

It is an object of the present invention to provide a computer with a function expansion mechanism and a function expansion method without removal of a computer, which are capable of completing function expansion without removing a computer host and providing all function modules with waterproofness using merely one single waterproof structure.

It is another object of the present invention to provide a computer with a function expansion mechanism and a function expansion method without removal of a computer, which are capable of enhancing assembly accuracy of a connector of a computer host and a docking connector of a function expansion device that are docked with each other.

It is yet another object of the present invention to provide a computer with a function expansion mechanism and a function expansion method without removal of a computer, which are capable of selectively using one lid having a corresponding structure when function expansion is desired, and selectively using another lid when function expansion is not needed in normal use.

To achieve the objects above, the present invention provides a computer with a function expansion mechanism. The computer with a function expansion mechanism includes: a computer host, including a base and a functional base cover covering the base, the base having a bottom surface, the bottom surface having a first opening, the base being provided therein with a connector exposed from the first opening; and a function expansion device, including an expansion seat, the expansion seat having a top surface, the top surface having a second opening, the expansion seat being provided therein with a docking connector exposed from the second opening. The computer host is stacked and assembled by the bottom surface at the top surface of the function expansion device, the first opening and the second opening are in communication with each other, and the connector is correspondingly docked with the docking connector.

The present invention further provides a computer with a function expansion mechanism for connecting to a function expansion device provided with a docking connector. The computer with a function expansion mechanism includes: a computer host, including a base and a functional base cover covering the base, the base having a bottom surface, the bottom surface having an opening, the base being provided therein with a connector exposed from the opening; and two lids, each of which detachably correspondingly covering the opening at the bottom surface, one of the lids having a window. When the bottom surface of the computer host and a surface of the function expansion device are stacked and assembled with each other, the one of the lids having the window is selected to cover the opening, and the connector is docked with the docking connector through the window. When the function expansion device is removed from the computer host, the other one of the lids is selected to cover and seal the opening.

The present invention further provides a function expansion method without removal of a computer. The function expansion method without removal of a computer includes: providing a computer host, the computer host including a base and a functional base cover covering the base, the base having a bottom surface and the base being provided therein with a connector; configuring a first opening by providing the first opening at the bottom surface, and exposing the connector from the first opening; providing a function expansion device, the function expansion device including an expansion seat, the expansion seat having a top surface; configuring a second opening by providing the second opening at the top surface; arranging a docking connector by providing the docking connector exposed from the second opening in the expansion seat; and assembling the function expansion device by stacking and assembling the bottom surface of the computer host and the top surface of the function expansion device with each other, communicating the first opening and the second opening with each other, and docking the connector and the docking connector with each other.

Compared to the prior art, the present invention provides effects including completing function expansion without removal of the computer host, providing all function modules with waterproofness using merely one single first waterproof structure, enhancing assembly accuracy of the connector of the computer host and the docking connector of the function expansion device that are docked with each other, and selectively using one lid having a corresponding structure when function expansion is desired and selectively using the other lid when function expansion is not needed in normal use.

DETAILED DESCRIPTION OF THE EMBODIMENTS

Details and technical contents of the present invention are given with the accompanying drawings below. It should be noted that the accompanying drawings are for illustration purposes and are not to be construed as limitations to the present invention.

Figure 1:
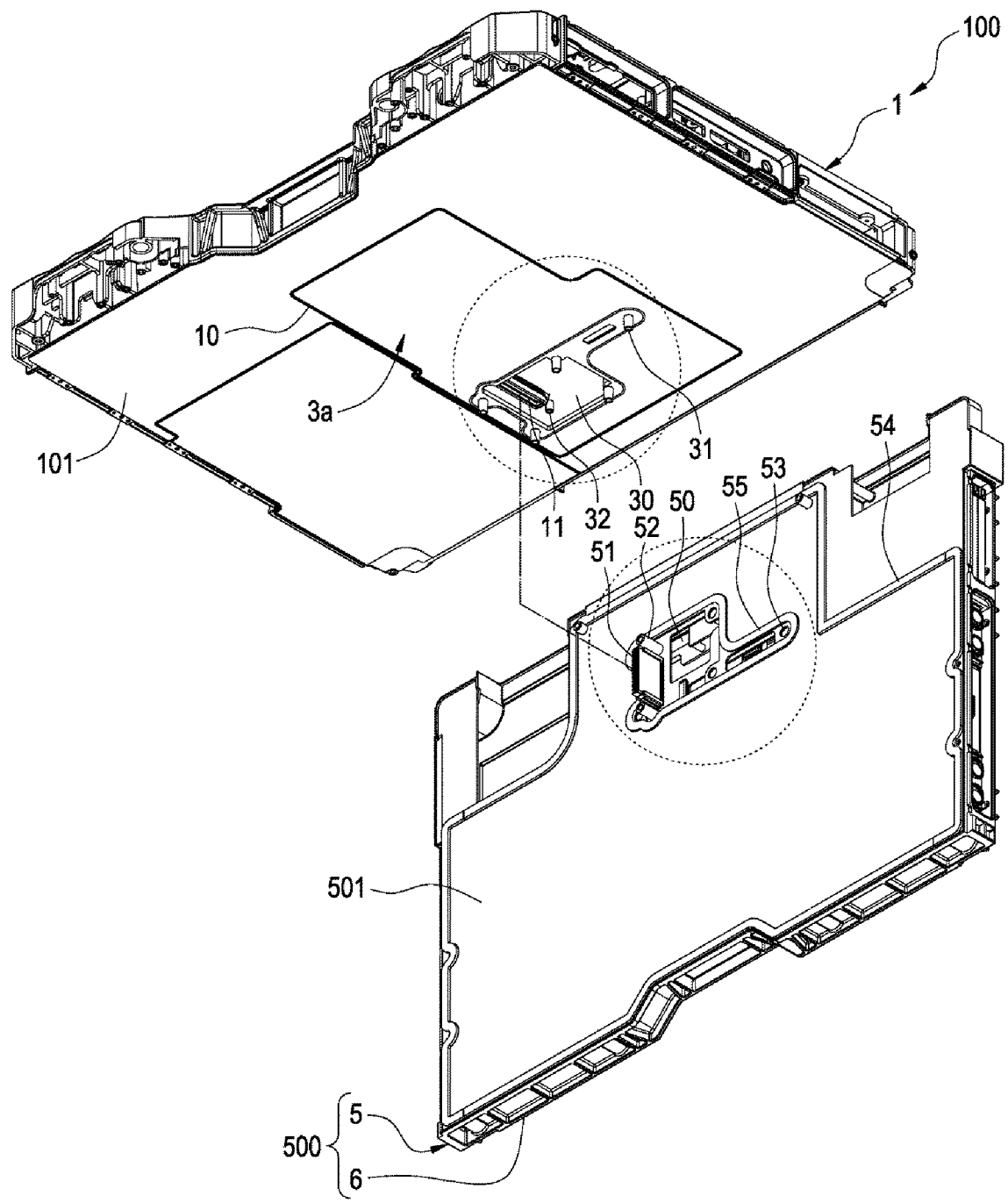
FIG. 1 is a three-dimensional exploded schematic diagram of a computer of the present invention.

The present invention provides a computer with a function expansion mechanism and a function expansion method without removal of a computer. As shown in FIG. 1, a computer with a function expansion mechanism of the present invention (to be simply referred to as a computer) includes a computer host 100 and a function expansion device 500 capable of detachably docking and assembling with each other.

As shown in FIG. 1 to FIG. 4, the computer host 100 includes a base 1 and a functional base cover 2, and preferably further includes at least one lid 3a, wherein the functional seat cover 2 covers the base 1.

The computer host 100 may be Part C and Part D (wherein Part C is the functional base cover 2 and Part D is the base 1) in a laptop computer, or in a tablet computer. When the computer host 100 is a laptop computer, the functional base cover 2 is a cover having a keyboard; when the computer host 100 is a tablet computer (similarly including the functional base cover 2 as Part C and the base 1 as Part D), the functional base cover 2 is a cover having a touch screen. In this embodiment, description is given by taking a tablet computer having Part C and Part D as an example of the computer host 100 (except in FIG. 4, the functional base cover 2 is omitted from the remaining drawings). The base 1 has a bottom surface 101 which is provided with a first opening 10. The base 1 is provided therein with a connector 11 which is exposed to the exterior through the first opening 10.

As shown in FIG. 1 to FIG. 4, the function expansion device 500 has at least two function modules 7a and 7b (referring to FIG. 3) embedded therein, and includes an expansion seat 5. More specifically, the function expansion device 500 further includes an expansion seat outer cover 6 which covers the expansion seat 5. Moreover, according to definition logics of Part C and Part D of the computer host 100, the expansion seat outer cover 6 acts as Part C of the function expansion device 500, and the expansion seat 5 acts as Part D of the function expansion device 500.

The expansion seat 5 has a top surface 501 which is provided with a second opening 50. The expansion seat 5 is provided therein with a docking connector 51 which is exposed to the exterior through the second opening 50.

Figure 4:
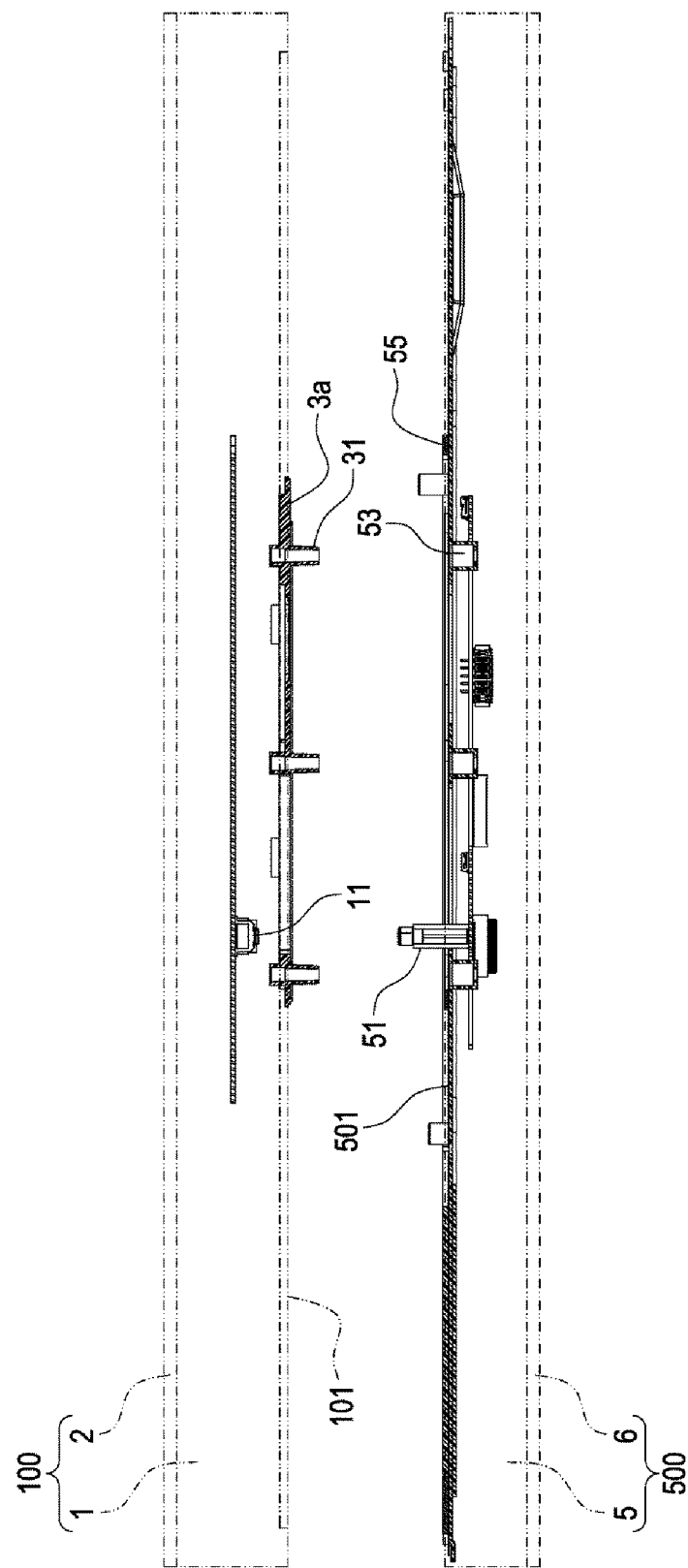
FIG. 4 is a side schematic diagram before docking and assembly of a computer of the present invention.
Figure 5:
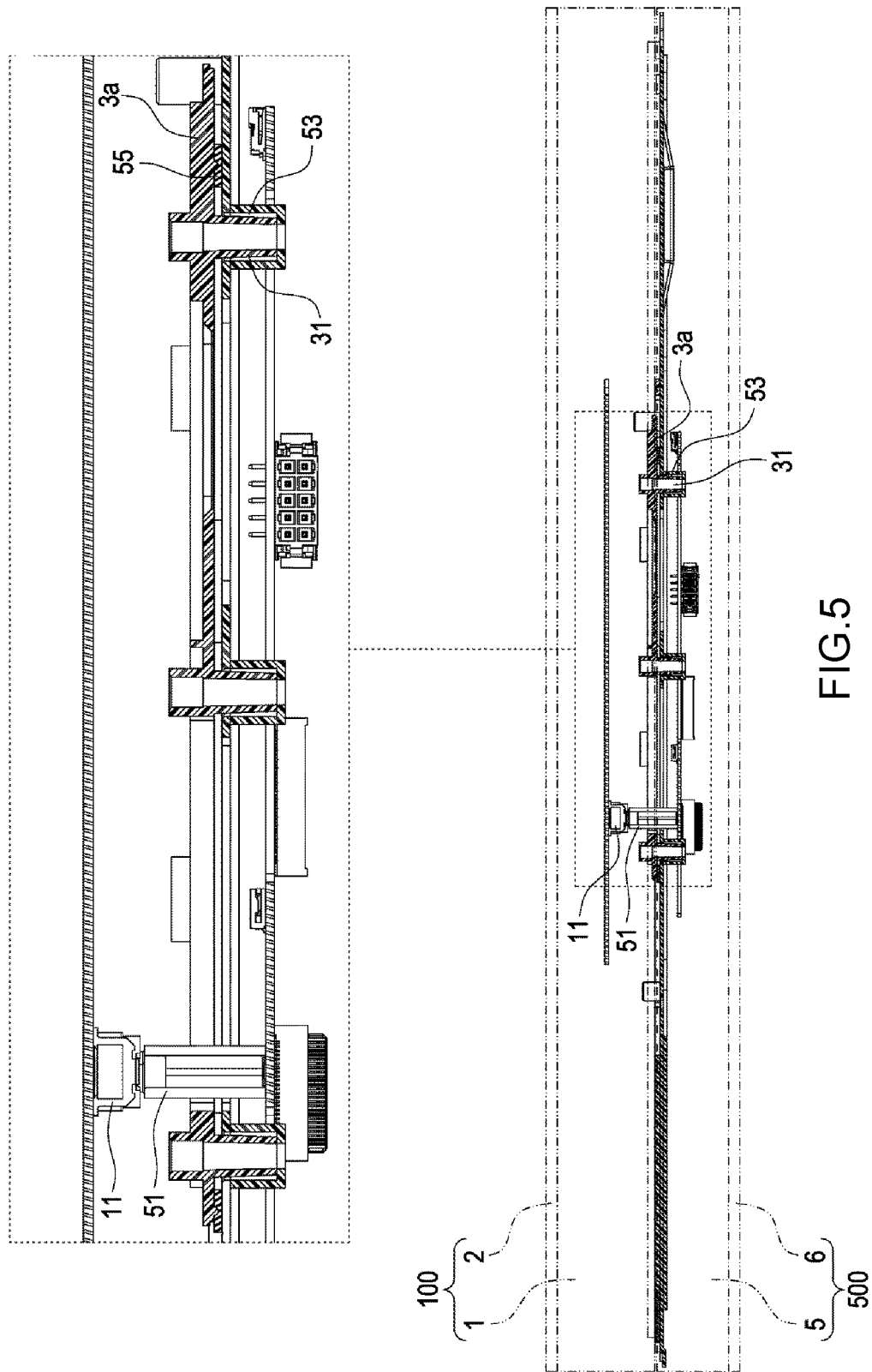
FIG. 5 is a side schematic diagram and partial enlarged diagram after docking and assembly of a computer of the present invention.
Figure 6:
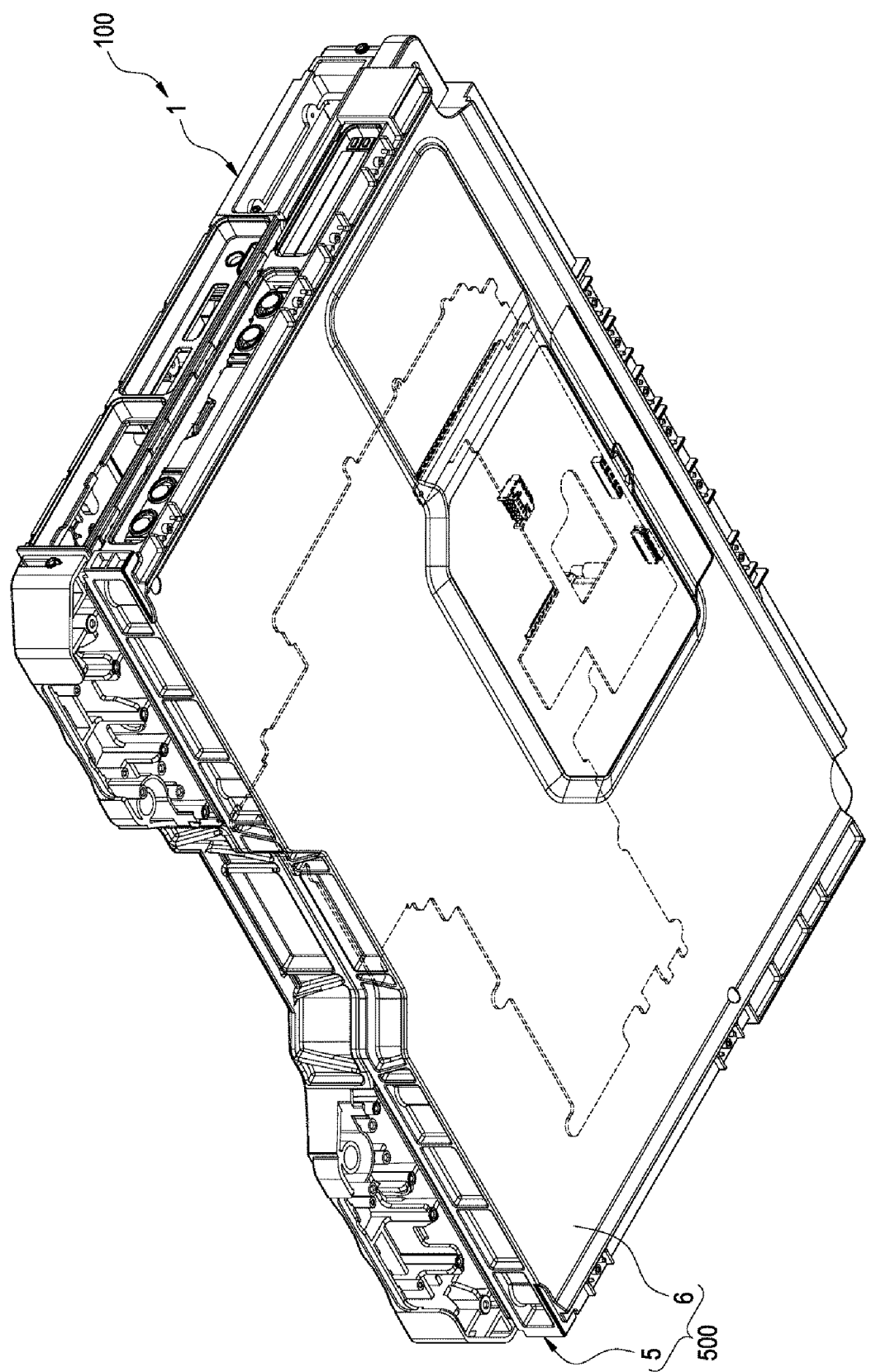
FIG. 6 is a three-dimensional schematic diagram after docking and assembly of a computer of the present invention.

As shown in FIG. 4 to FIG. 6, when function expansion is desired, the bottom surface 101 of the computer host 100 is stacked and assembled at the top surface 501 of the function expansion device 500, such that the first opening 10 and the second opening 50 are in communication with each other and the connector 11 is correspondingly docked with the docking connector 51 and hence electrically connected.

As such, when function expansion in the computer of the present invention is desired, the connector 11 and the docking connector 51 can be docked with each other to complete function expansion by simply stacking and assembling the bottom surface 101 of the computer host 100 at the top surface 501 of the function expansion device 500; that is to say, function expansion can be achieved without any removal of the computer host 100. It should be noted that, the base 1 having the bottom surface 101 acts as Part D of the computer host 100, and the expansion seat 5 having the top surface 501 acts as Part D of the function expansion device 500. Thus, when function expansion of the computer of the present invention is desired, Part D of the computer host 100 and Part D of the function expansion device 500 are docked and assembled with each other in a face-to-face manner (the bottom surface 101 facing the top surface 501). Moreover, since docking and assembly between the computer host 100 and the function expansion device 500 are performed by placing the bottom surface 101 and the top surface 501 face to face, all function modules (for example, the function modules 7a and 7b) can be provided with waterproofness by arranging one waterproof structure between the bottom surface 101 and the top surface 501, with associated details to be described below.

To enhance mutual docking and assembly accuracy, as shown in FIG. 1 to FIG. 5, a plurality of positioning columns and a plurality of corresponding positioning portions may be respectively arranged at the base 1 (or the lid 3a) and the expansion seat 5, so as to allow the connector 11 and the docking connector 51 to accurately dock with each other by correspondingly inserting the position columns into the corresponding positioning portions. It should be noted that, the positioning columns, the corresponding positioning portions, or a combination of the position columns and the positioning portions may be directly arranged at the base 1 (not shown), or may be arranged at the lid 3a as shown; in this embodiment, an example of an arrangement at the lid 3a is given.

The present invention does not define which is to be provided with the positioning columns and which is to be provided with the corresponding positioning portions, and the two may also be arranged in a mixed manner. More specifically, the positioning columns include a plurality of (two or more) first positioning columns 31 and a plurality of second positioning columns 52, and the corresponding positioning portions include a plurality of first corresponding positioning portions 53 and a plurality of second corresponding positioning portions 32.

The lid 3a may detachably correspondingly cover the position of the first opening 10 at the bottom surface 101, and is provided with a window 30. The connector 11 is exposed to the exterior through the window 30. The first positioning columns 31 are protrudingly provided correspondingly to the outline of the window 30. The top surface 501 of the expansion seat 5 is provided with a plurality of first corresponding positioning portions 53 corresponding to the first positioning columns 31. Accordingly, when the computer host 100 and the function expansion device 500 are docked and assembled with each other, the first positioning columns 31 are respectively inserted into the first corresponding positioning portions 53 and thus guiding and positioning effects are achieved, allowing the connector 11 and the docking connector 51 to be accurately docked with each other.

Preferably, a second positioning column 52 protruding from the top surface 501 may be further provided at each of two opposite positions of the docking connector 51, two second corresponding positioning portions 32 (which may be insertion holes or insertion pins) corresponding to the second positioning columns 52 may be provided in the base 1, and the second corresponding positioning portions 32 can be respectively inserted correspondingly with the second positioning columns 52. Since the second positioning columns 52 are close to the docking connector 51 and the second corresponding positioning portions 32 are also close to the connector 11, docking accuracy between the connector 11 and the docking connector 51 can be further enhanced.

Moreover, the height of the second positioning columns 52 may be more than the height of the docking connector 51, so that the second positioning columns 52 also provide an effect of protecting the docking connector 51 which likely receives impact and hence be damaged as being protruding from the top surface 501.

Figure 2A:
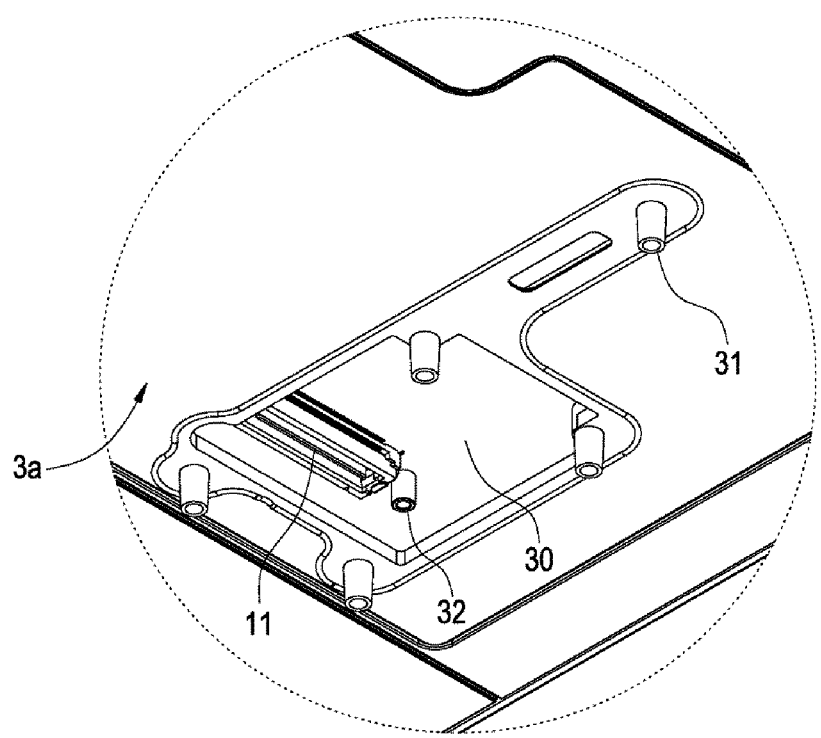
FIG. 2A and FIG. 2B are partial enlarged schematic diagrams of FIG. 1.
Figure 2B:
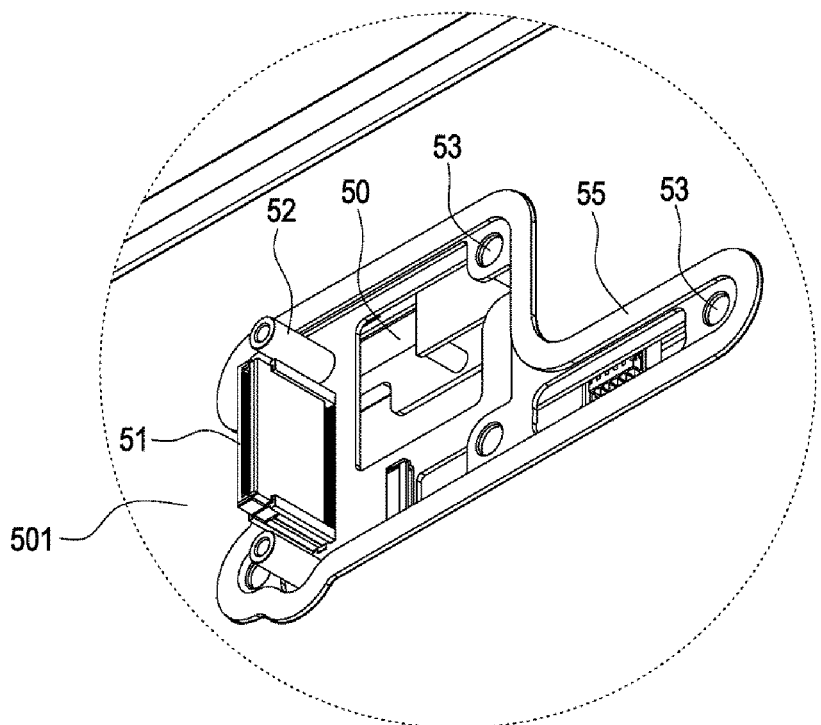
Figure 3:
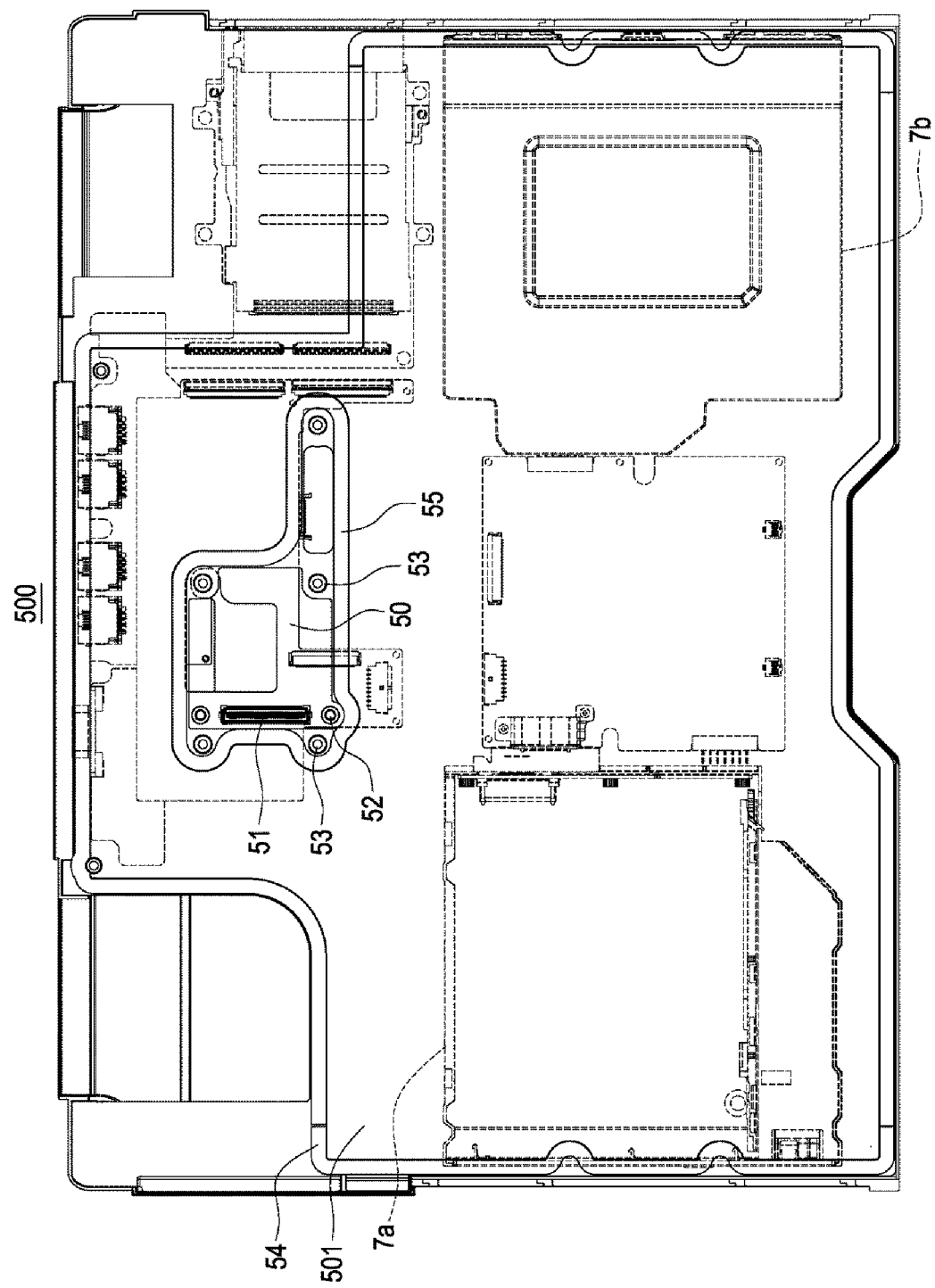
FIG. 3 is a top schematic diagram of a function expansion device in a computer of the present invention.

To provide the computer of the present invention with waterproofness after the assembly and docking, as shown in FIG. 1, FIG. 3 and FIG. 5, a first waterproof structure 54 and a second waterproof structure 55 are arranged at the top surface 501 of the expansion seat 5. The first waterproof structure 54 surrounds the expansion seat 5 by a large area and covers all function modules (for example, the function modules 7a and 7b) as shown in FIG. 3, thus producing waterproofness for both the function modules 7a and 7b. The second waterproof structure 55 surrounds correspondingly to the outline of the window 30, and covers the docking connector 51, the second positioning columns 52 and the first corresponding positioning portions 53 as shown in FIG. 2B, thus producing waterproofness for the connector 11 and the docking connector 51.

As such, when the computer host 100 and the function expansion device 500 are docked with each other, since the bottom surface 101 of the computer host 100 is pressed against the first and second waterproof structures 54 and 55 arranged at the top surface 501 of the function expansion device 500, the first and second waterproof structures 54 and 55 are allowed to produce waterproofness between the bottom surface 101 and the top surface 501, prohibiting liquid from seeping through the joint of the computer host 100 and the function expansion device 500 into the computer of the present invention. In other words, both the function modules 7a and 7b are surrounded by the first waterproof structure 54, and so waterproof mechanisms are not required respectively for individual function modules as those in the prior art. In addition, the window 30 for docking the connector 11 and the docking connector 51 is also provided with waterproofness by the second waterproof structures 55, further providing comprehensive waterproofness for the computer of the present invention.

Figure 7:
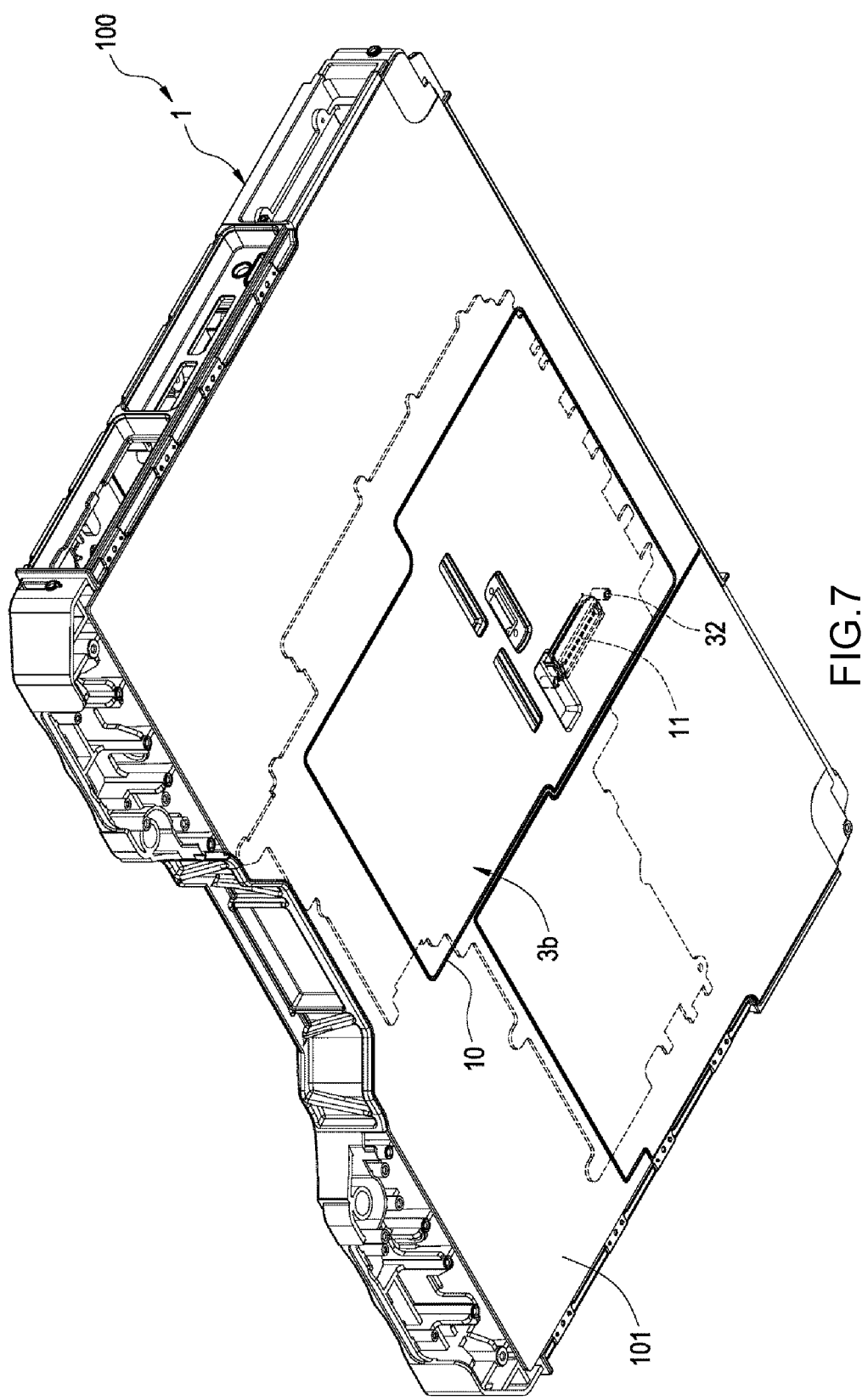
FIG. 7 is a bottom schematic diagram after a computer host changing to another lid in a computer of the present invention.

As shown in FIG. 7, to keep the connector 11 unexposed from the window 30 when the computer 100 does not need function expansion in normal use, the computer host 100 may be additionally provided with another lid 3b. The lid 3b is substantially the same as the lid 3a above, and differs by at least two aspects—the lid 3b is not provided with the window 30 and is not provided with the protruding first positioning columns 31. When a user desires for function expansion, the lid 3a in FIG. 1 may be selected to correspondingly assemble with the first opening 10 so as to facilitate function expansion; when a user wishes to use the computer host 100 as normal instead of function expansion, the lid 3b shown in FIG. 7 may be selected to correspondingly assemble with the first opening 10 so as to facilitate normal use of the computer host 100.

Figure 8:
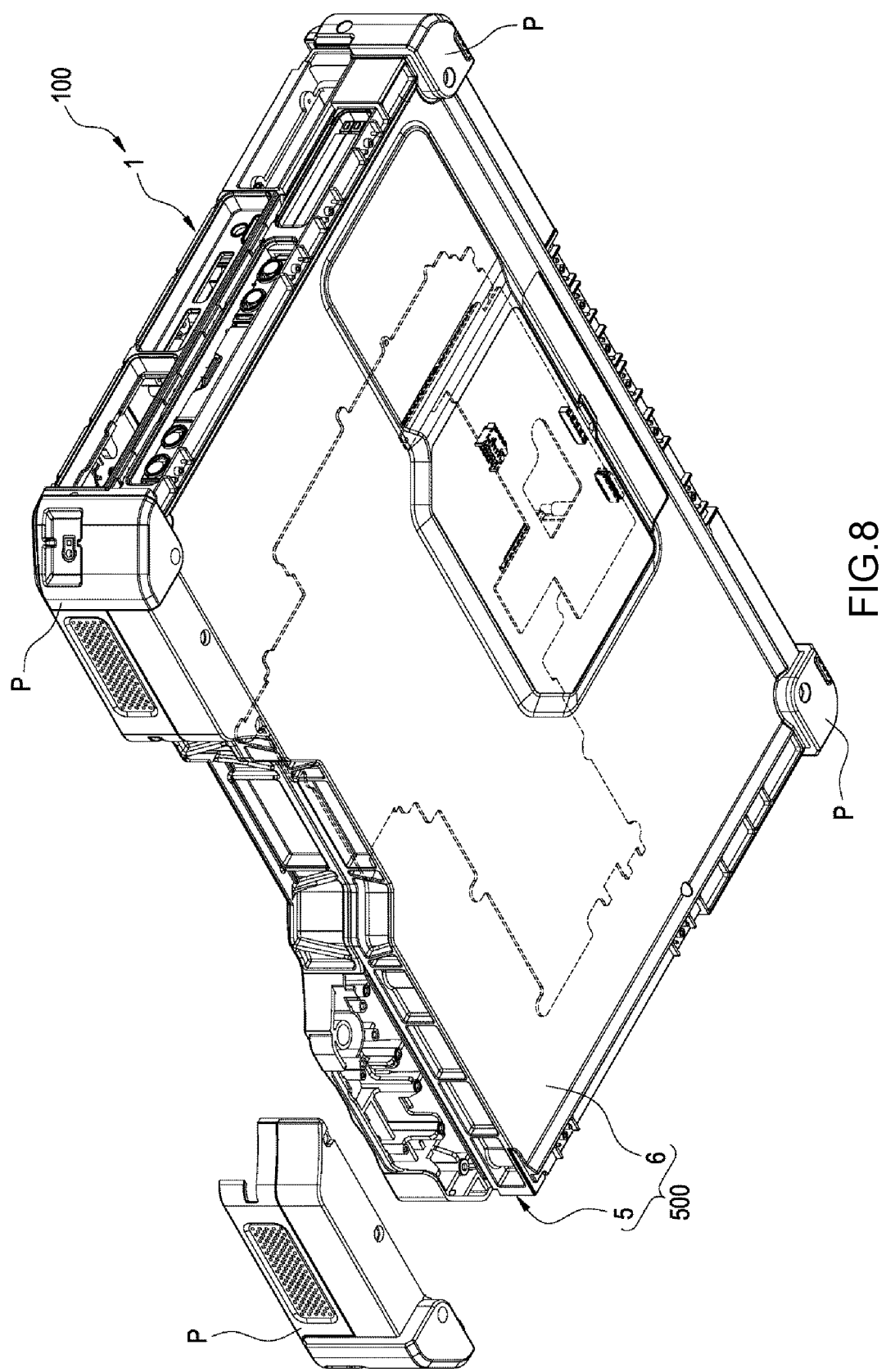
FIG. 8 is a three-dimensional schematic diagram of a computer sleeved with foot pads of the present invention.

As shown in FIG. 8, to enhance structural stability of the computer host 100 after docking and assembling with the function expansion device 500, the present invention may further include a plurality of foot pads P. More specifically, before insertion and positioning of the positioning columns and the corresponding positioning portions (for example, the first positioning columns 31, the first corresponding positioning portions 53, the second positioning columns 52 and the second corresponding positioning portions 32), four old foot pads (not shown) originally sleeved at four corners of the computer host 100 are first removed, the computer host 100 is then docked and assembled with the function expansion device 500 (at this point in time, the positioning columns are respectively inserted and positioned with the corresponding positioning portions), and four new foot pads P are respectively sleeved at four corners after the computer host 100 is docked and assembled with the function expansion device 500, thereby enhancing the structural stability of the computer host 100 after docking and assembling with the function expansion device 500.

Figure 9:
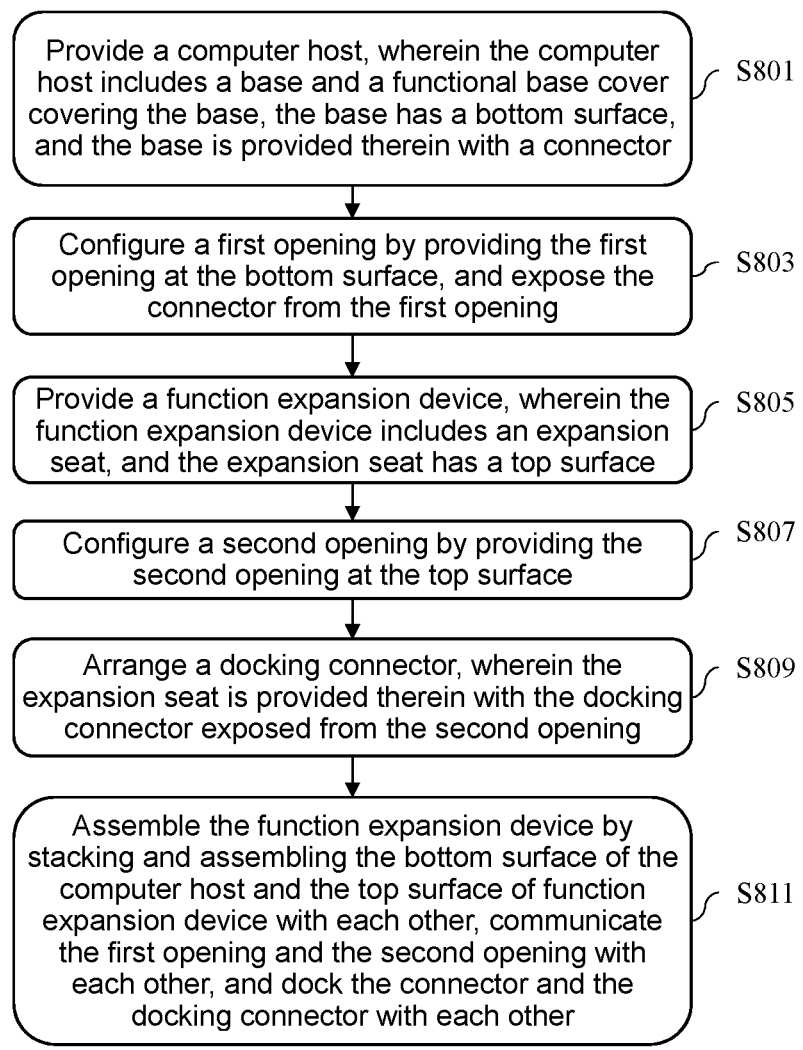
FIG. 9 is a flowchart of a function expansion method of the present invention.

As shown in FIG. 9, a function expansion method without removal of a computer includes following steps: step S801, providing a computer host 100; step S803, configuring a first opening 10; step S805, providing a function expansion device 500; step S807, configuring a second opening 50; step S809, arranging a docking connector 51; and step S811, assembling the function expansion device 500.

In step S801, the computer host 100 is provided. The computer host 100 includes a base 1 and a functional base cover 2 covering the base 1, the base 1 has a bottom surface 101, and the base 1 is provided therein with a connector 11. In step S803, the first opening 10 is configured by providing the first opening 10 at the bottom surface 101, and the connector 11 is exposed from the first opening 10. In step S805, the function expansion device 500 is provided. The function expansion device 500 includes an expansion seat 5 which has a top surface 501. In step S807, the second opening 50 is configured by providing the second opening 50 at the top surface 501. In step S809, the docking connector 51 is arranged. The docking connector 51 is arranged in the expansion seat 5, and the docking connector 51 is exposed from the second opening 50. In step S811, the function expansion device 500 is assembled. The bottom surface 101 of the computer host 100 and the top surface 501 of the function expansion device 500 are stacked and assembled with each other, such that the first opening 10 and the second opening 50 are in communication with each other and the connector 11 and the docking connector 51 are docked and in electrical communication with each other.

Therefore, with the function expansion method of the present invention above, function expansion can be completed without involving any removal of the computer host 100.

It should be noted that, the function expansion method without removal of a computer can further include other steps, for example, sleeving a plurality of new foot pads P, as described below. As shown in FIG. 8 and FIG. 9, before step S811 is performed, four old foot pads (not shown)

originally sleeved at four corners of the computer host 100 are first removed, then step S811 is performed to dock and assemble the computer host 100 with the function expansion device 500 (at this point in time, the positioning columns are respectively inserted and positioned with the corresponding positioning portions), and four new foot pads P are respectively sleeved at the four corners after the computer host 100 is docked and assembled with the function expansion device 500, thereby enhancing the structural stability of the computer host 100 after docking and assembling with the function expansion device 500.

In conclusion, the computer with a function expansion mechanism and the function expansion method without removal of a computer of the present invention are capable of achieving expected utilization objects and resolve issues of the prior art, and thus meet the requirements of a patent application. Therefore, a patent application is filed accordingly, and granting the application with patent rights is respectfully requested to ensure rights of the Inventor.

While the present invention has been described by way of preferred embodiments above, it is to be understood that the present invention is not limited thereto. Equivalent structural changes made on the basis of the description and drawings of the present application are encompassed within the scope of the present invention.

What is claimed is:

1. A computer with a function expansion mechanism, comprising:
    a computer host, comprising a base and a functional base cover covering the base, the base having a bottom surface, the bottom surface having a first opening, the base being provided therein with a connector exposed from the first opening; and
    a function expansion device, comprising an expansion seat, the expansion seat having a top surface, the top surface having a second opening, the expansion seat being provided therein with a docking connector exposed from the second opening;
    wherein, the computer host is stacked and assembled by the bottom surface at the top surface of the function expansion device, the first opening and the second opening are in communication with each other, and the connector is docked correspondingly with the docking connector,
    wherein the computer host further comprises a lid, the lid detachably correspondingly covers the first opening at the bottom surface and is provided with a window, and the connector is exposed through the window,
    wherein the lid is provided with a plurality of first positioning columns and the top surface is provided with a plurality of first corresponding positioning portions, the first positioning columns and the first corresponding portions comprise insertion cylinder pins and cylindrical holes, and wherein the connector is accurately docked with the docking connector in a way that the first positioning columns are correspondingly pluggably inserted into the first corresponding positioning portions.

2. The computer with a function expansion mechanism of claim 1, wherein the function expansion device is provided with a first waterproof structure at a stacking joint between the bottom surface of the base and the top surface of the expansion seat, the function expansion device is provided therein with a plurality of function modules, and the first waterproof structure correspondingly surrounds all the function modules and hence provides waterproofness.

3. The computer with a function expansion mechanism of claim 1, wherein the function expansion device is provided with a second waterproof structure at a stacking joint between a position corresponding to the second opening at the top surface of the expansion seat and a position of the window of the lid, and the second waterproof structure surrounds the connector and the docking connector and hence provides waterproofness.

4. The computer with a function expansion mechanism of claim 1, wherein the top surface is further provided with a plurality of second positioning columns and the lid is further provided with a plurality of second corresponding positioning portions, the second positioning columns are correspondingly pluggably inserted into the second corresponding positioning portions, and the second positioning columns are erected at the expansion seat and close to the docking connector.

5. The computer with a function expansion mechanism of claim 4, wherein a height of the second positioning columns is more than a height of the docking connector to help protect the docking connector.

6. The computer with a function expansion mechanism of claim 1, wherein the computer host is a tablet computer or a laptop computer.

7. The computer with a function expansion mechanism of claim 1, wherein the functional base cover is a cover having a touch screen or a cover having a keyboard.

8. A computer with a function expansion mechanism for connecting a function expansion device provided with a docking connector, the computer comprising:
    a computer host, comprising a base and a functional base cover covering the base, the base having a bottom surface, the bottom surface having an opening, the base being provided therein with a connector exposed from the opening; and
    two lids, each of the lids being detachably covering the opening at the bottom surface, one of the lids having a window;
    wherein, when the bottom surface of the computer host and one surface of the function expansion device are stacked and assembled with each other, the one of the lids having the window is selected to cover the opening, and the connector is docked with the docking connector through the window; when the function expansion device is removed from the computer host, the other one of the lids is selected to cover and seal the opening,
    wherein the one of the lids having the window is provided with a plurality of first positioning columns and the one surface of the function expansion device is provided with a plurality of first corresponding positioning portions, the first positioning columns and the first corresponding portions comprise insertion cylinder pins and insertion cylindrical holes, and wherein the connector is accurately docked with the docking connector in a way that the first positioning columns are correspondingly pluggably inserted into the first corresponding positioning portions.

9. The computer with a function expansion mechanism of claim 8, further comprising a first waterproof structure and a second waterproof structure, the first water proof structure and the second waterproof structure are both arranged on the function expansion device, the first waterproof structure correspondingly surrounds the function expansion device, and the second waterproof structure corresponds to a position of the window and surrounds the connector and the docking connector.

10. A function expansion method without removal of a computer, comprising the steps of:
  providing a computer host, the computer host comprising a base and a functional base cover covering the base, the base having a bottom surface, and the base being provided therein with a connector;
  configuring a first opening by providing the first opening at the bottom surface, and exposing the connector from the first opening;
  providing a function expansion device, the function expansion device comprising an expansion seat, the expansion seat having a top surface;
  configuring a second opening by providing the second opening at the top surface;
  arranging a docking connector, the expansion seat being provided therein with the docking connector exposed from the second opening; and
  assembling the function expansion device by stacking and assembling the bottom surface of the computer host and the top surface of the function expansion device with each other, communicating the first opening and the second opening with each other, and docking the connector and the docking connector with each other,
  wherein the computer host further comprises a lid, the lid detachably correspondingly covers the first opening at the bottom surface and is provided with a window, and the connector is exposed through the window,
  wherein the lid is provided with a plurality of first positioning columns and the top surface is provided with a plurality of first corresponding positioning portions, the first positioning columns and the first corresponding portions comprise insertion cylinder pins and insertion cylindrical holes, and wherein the connector is accurately docked with the docking connector in a way that the first positioning columns are correspondingly pluggably inserted into the first corresponding positioning portions.

* * * * *